United States Patent [19]

Liebman

[11] 4,455,113

[45] Jun. 19, 1984

[54] METHOD OF PRODUCING GROUPED SYMBOLS

[75] Inventor: Steve Liebman, Fort Lee, N.J.

[73] Assignee: Namecraft Manufacturing Corp., Hackensack, N.J.

[21] Appl. No.: 301,277

[22] Filed: Sep. 11, 1981

[51] Int. Cl.³ .......................... B23C 1/16; B23Q 33/00

[52] U.S. Cl. ........................................ 409/84; 409/86; 409/130; 63/20; 63/23

[58] Field of Search ................ 63/20, 23; 40/618, 596; 409/86, 89, 901, 130; 101/372, 401.4; 199/1

[56] References Cited

U.S. PATENT DOCUMENTS

| | | | |
|---|---|---|---|
| 393,413 | 11/1888 | Young | 63/20 |
| 1,559,572 | 11/1925 | Kapner | 40/596 X |
| 2,024,085 | 12/1935 | Baer | 40/618 |
| 2,123,704 | 7/1938 | Meissner | 40/618 |
| 2,251,166 | 7/1941 | Preis | 409/130 |
| 2,342,237 | 2/1944 | Barbieri | 40/618 X |
| 2,495,519 | 1/1950 | Gregson et al. | 409/86 |
| 2,551,953 | 5/1951 | Larson | 409/86 X |
| 3,335,509 | 8/1967 | Braxton | 40/618 X |
| 3,537,202 | 11/1970 | Braun et al. | 40/618 |
| 3,781,182 | 12/1973 | Friedman | 409/130 X |
| 4,020,908 | 6/1977 | Michael | 63/23 |

*Primary Examiner*—Mickey Yu

*Attorney, Agent, or Firm*—Ernest F. Marmorek

[57] ABSTRACT

A method and an article, produced by the method, of symbols arranged in a group, taken from a plurality of identifiable symbols, and which may be produced in one piece from a plate of metal with the aid of a set of separate master symbols, wherein selected of the master symbols represent the group of arranged symbols, and with the aid of a transfer-and metal-removing mechanism for transferring the contours of the master symbols onto the plate.

11 Claims, 8 Drawing Figures

FIG I

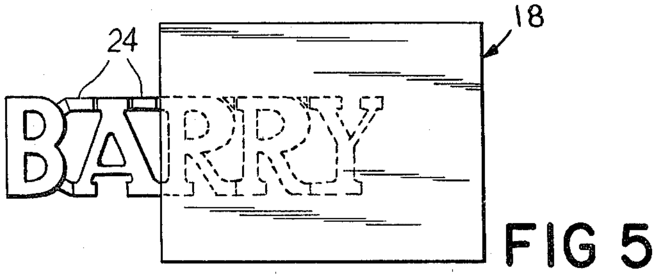
FIG 5
FIG 6
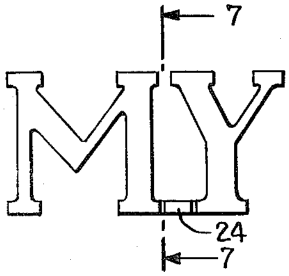
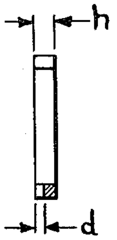
FIG 7
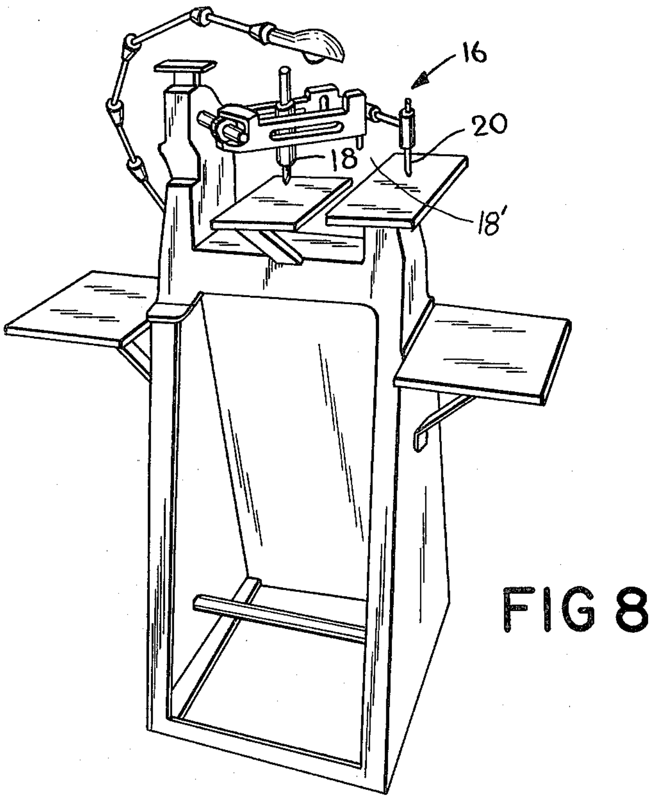
FIG 8

METHOD OF PRODUCING GROUPED SYMBOLS

BACKGROUND OF THE INVENTION

It is known to produce a group of symbols, for example a group of letters, in a single piece, for example by stamping out individual letters from a plate of metal, and then joining the individual letters by soldering, welding or the like. It is also known to stamp out a complete group of symbols, for example letters, from metal.

Both the above-noted methods have disadvantages, however. Soldering or welding individual letters together results either in an unsightly group of letters, or renders the resultant piece relatively weak. Furthermore, it is relatively time consuming to solder or weld letters together. On the other hand, stamping out a group of letters requires a separate master die for each group of the letters, and is therefore quite costly.

SUMMARY OF THE INVENTION

It is therefore one of the principal objects of the present invention to avoid the aforesaid drawbacks, and in particular to devise a method of producing a group of letters, and an article produced by the method, in which a custom-tailored group of letters, for example, a name, can be selected by a customer, and in which the selected group of letters can be produced in a single strong piece without the necessity of either soldering or welding the individual letters together, or of providing a die for each separate group of letters.

The object of producing identifiable symbols arranged in a group in one piece from a plate of metal is attained with the aid of a multiplicity of master symbols selected from a set of master symbols representing the arranged symbols, and defining external and internal contours of each master symbol, and with the aid of a transfer-and metal-removing mechanism for transferring the contours onto the plate, and for removing metal therefrom by steps comprising removing selected metal portions from the plate near the contours of each respective arranged symbol so as to define at least a substantial portion of each arranged symbol sufficient to identify a master symbol corresponding thereto, and removing selected metal portions from the plate between and near adjacent of the arranged symbols, so as to preserve connecting portions therebetween, and thereby to obtain the group of arranged symbols in one piece.

Further objects and advantages of the invention will be set forth in part in the following Specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings in which:

FIG. 5 is a plan view of a group of letters in the process of being cut out from a plate, the contour of the letters yet to be removed from the plate being shown dotted;

FIG. 6 is a further embodiment of the present invention with the bridging portion between adjacent arranged symbols giving the appearance of being separate from the symbols;

FIG. 7 is a cross-section of FIG. 6 along the line 7—7; and

FIG. 8 is a perspective view of a transfer-and metal-removing mechanism used in producing the article according to the present invention.

DESCRIPTION OF THE PREFERRED EMBODIMENTS

Figure 1:
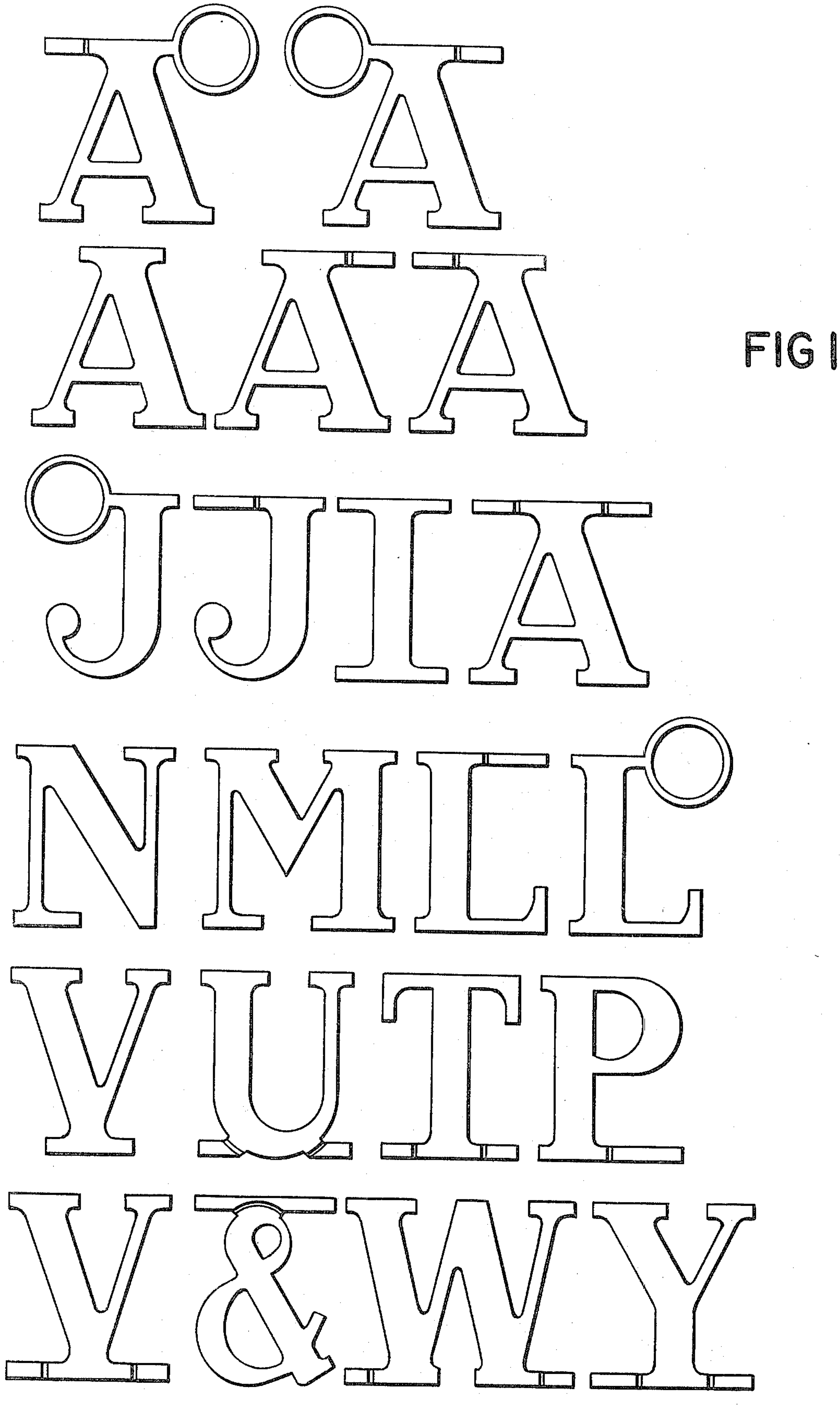
FIG. 1 is a group of letters and symbols designed for use in the present invention.
Figure 2:
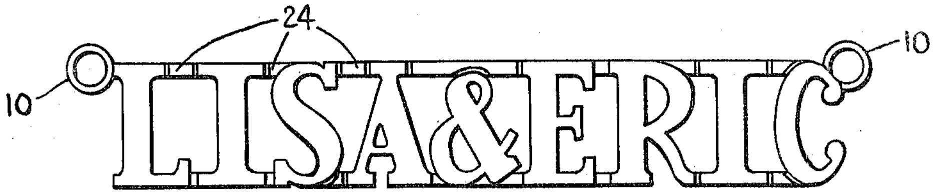
FIG. 2 is a first embodiment of the present invention where a symbol and several letters are arranged so that the group of letters can be read from left to right, where the arrangement of letters is in one piece, and loops are provided at the end portions of the piece adapted to be connected to a chain.
Figure 3:
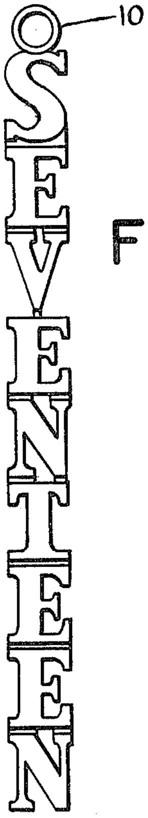
FIG. 3 is another embodiment of the present invention, where the group of letters are arranged to be read downwards in a vertical direction and are made in one piece, a loop being provided on the topmost letter adapted to be connected to a chain.

In carrying the present invention into effect there will be seen in FIG. 1 identifiable symbols, for example capital letters and an "&" symbol, specially designed for use in the present invention. One version of an article produced according to the present invention is shown in FIG. 2; a group of letters arranged to be read from left to right, one group of letters representing a first name, another group of letters representing a second name, and an "&" symbol being arranged between the letters representing the two names, is in the form of a longitudinal strip made from a single metal plate. The letters at each end of the longitudinal strip are provided with a loop 10 each, and the loops 10 are adapted to be connected, for example, to a chain. Another version of the present invention is shown in FIG. 3, where symbols, in this instance capital letters, are arranged to be read vertically downwards, and a loop 10 is provided on the topmost letter adapted to be connected to a chain or the like. The letters and the loop 10 are again formed in a single piece from a metal plate.

Figure 4:
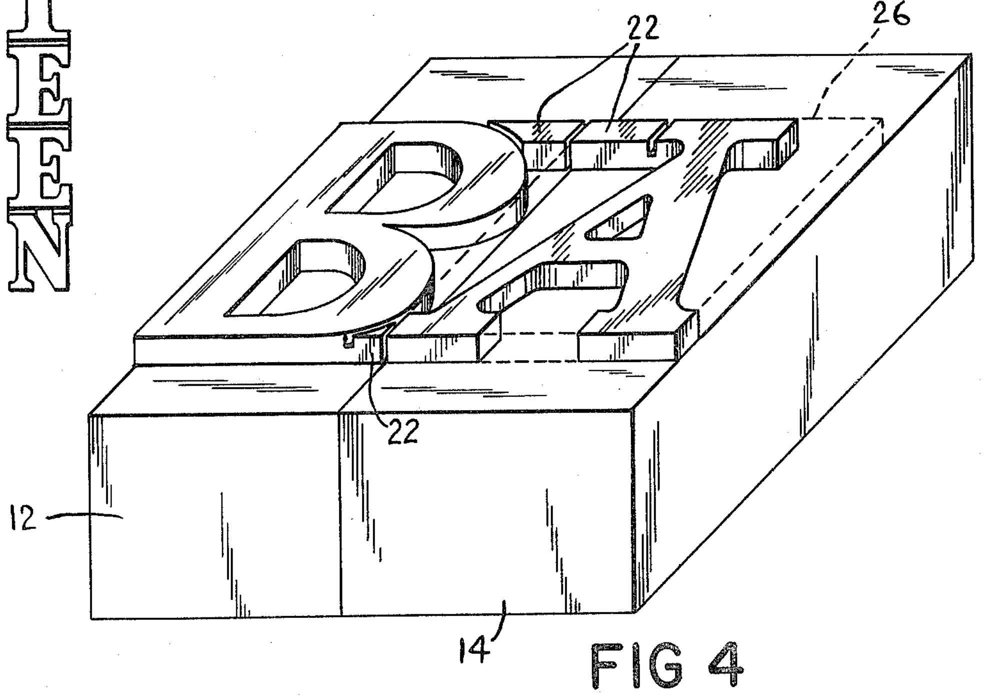
FIG. 4 is a perspective view of two master symbols placed adjacent one another.

In FIG. 4 there are shown master symbols "B" and "A" which are embossed on respective blocks 12 and 14. It will be seen that the master symbols "B" and "A" define internal and external contours thereon. A transfer-and metal-removing mechanism 16, for example, a panto-engraver produced by the H. P. Preis engraving machine company is used for transferring the contours onto a signle plate 18, from which selected metal portions are removed so as to obtain the group of arranged symbols in a single piece. FIG. 5 shows the metal plate 18, wherein some metal portions have been removed so that the letters "B" and "A" are shown, the contours of the remaining letters, namely the letters R, R and Y being shown in dotted lines on the plate 18. The panto-engraver 16 is provided with a feeler 18' which is designed to feel the contours of the master symbols and a cutter 20 is linked to the feeler 18' in a predetermined manner, so that when the feeler 18' is moved around the contours of the master symbols on the blocks 12 and 14, a substantial facsimile of the symbols disposed on the blocks 12, 14 and succeeding (non-illustrated) blocks is created in the configuration obtained from the metal plate 18, when the cutter 20 removes selected metal portions from the plate 18.

The substantial facsimile of the pattern traced by the feeler as a result of feeling the contours of the master symbols has a predetermined ratio to the original pattern, for example, a prearranged reduction ratio.

The embodiments of the invention shown in FIG. 2 and FIG. 3 are only representative examples; the master symbols may be arranged along any prearranged direction, for example in the shape of a circle, so as to convey a predetermined meaning, resulting in the group of arranged symbols conveying the predetermined meaning when read along a certain direction which corresponds to the predetermined direction of the assembled master symbols.

It is essential for the present invention that selected master symbols include connective portions, for example a connective portion 22, seen in FIG. 4, which is appropriately placed near the bottom or top portion of a corresponding letter, so as to give the apparance of a non-bridging portion existing between two master symbols when they are placed adjacent one another. The connective portions may form part of a corresponding letter, or may be separate therefrom; the placement of the connective portions in strategic places permits removal of selected metal portions between and near corresponding adjacent arranged symbols so as to obtain bridging portions 24 between adjacent arranged symbols, as best seen, for example, in FIG. 2.

The plate 18 has a predetermined height h; in a further development selected metal portions are removed from the bridging portions or symbols 24 near respective adjacent of the arranged symbols to a depth d which is smaller than the height h, so as to create the appearance of the bridging portions or symbols 24 being separate from corresponding adjacent symbols, as best seen in FIG. 6; FIG. 7, which is a cross-section of FIG. 6 along the line 7—7, clearly shows that the indentation between a bridging portion 24 and an adjacent symbol has a depth d smaller than the height h.

The connective portion 22 of a master symbol extends in a direction towards another master symbol which may be placed adjacent thereto, and has a length not projecting beyond the confines of an imaginary rectangle 26 substantially defining the boundaries of a respective master symbol.

The creation of these connecting or bridging portions in the group of arranged and identifiable symbols provides a pleasing appearance in the manufactured article without detracting from the identification of the letters, and the meaning of the word the letters are intended to convey.

A pleasing arrangement of the letters is obtained, for example, if the letter A is provided with a connective portion 22 in the form of a rectangle of a width about equal to the width of the crossbar of the letter A, and a length slightly less than that of the crossbar, and projects near the top of the letter A leftwards, rightwards, or both leftwards and rightwards. The length of the connective portion should be such that when a corresponding master symbol is placed adjacent another master symbol the appearance of a bridging portion existing between the master symbols results. The connective portions provided for selected letters in the set of master symbols will thus be seen to result in the formation of a corresponding longitudinal extension of a corresponding symbol or letter of the group of arranged symbols.

Similarly it is advantageous if the letter J includes a connective portion in the shape of a rectangle similar to the rectangle employed for the letter A, but of a length exceeding that of the length of the rectangle employed for the letter A, which projects near the top of the letter J in a direction parallel to the direction of the crossbar of the letter A.

In an analogous manner the letter L is provided with a connecting portion in the form of a rectangle projecting near the top thereof outwardly in a direction parallel to the direction of the crossbar of the letter A.

The letter U is preferably provided with a first trapezoid of a width about equal to that of the crossbar of the letter A and of a mean length about equal to that of the connective portion provided for the letter A which projects leftwards near the bottom thereof, and a second trapezoid similar to the first trapezoid which projects rightwards near the bottom thereof.

The letter T is advantageously provided with a rectangle similar in appearance to the connective portion provided for the letter A, but which has a smaller length, and projects leftwards near the bottom thereof, and another rectangle similar to the rectangle projecting leftwards, but which projects rightwards near the bottom of the letter T.

The letter P is preferably provided with a connective portion in the shape of a rectangle similar to the connective portion provided for the letter A, but of a length exceeding that of the connective portion for the letter A which projects near the bottom thereof rightwards.

The letter V is similarly provided with projecting portions near the bottom thereof which extend leftwardly and rightwardly therefrom.

The symbol "&" is advantageously provided with a connective bar near an extremity thereof as viewed in a longitudinal direction.

The letter W advantageously is provided with connective portions projecting leftwardly and rightwardly near the bottom thereof.

The letter Y is also advantageously provided with connective portions projecting leftwardly and rightwardly near the bottom thereof.

It is further advantageous if selected top and bottom portions of the letters used for the master symbols of the present invention are provided with suitable extensions near the top and bottom thereof, which appear ornamental, but are in fact used as connective portions. These "ornamental" extensions are shown in FIG. 1 as part of the respective letter and not separate therefrom.

I wish it to be understood that I do not desire to be limited to the exact details of construction shown and described, for obvious modifications will occur to a person skilled in the art.

Having thus described the invention, what I claim is new and desire to be secured by a letters patent is as follows:

1. In a method of producing identifiable symbols, arranged in a group in one piece free from any soldered connection therebetween, from a plate having a predetermined height, with the aid of a multiplicity of master symbols selected from a set of master symbols representing said arranged symbols, each master symbol having throughout its major portion a certain thickness, and each master symbol defining contours, and with the aid of a transfer mechanism and metal-removing mechanism for feeling said contours to transfer said contours substantially onto said plate while removing metal therefrom, the steps comprising, removing said metal portions throughout said height from said plate near the contours of each respective arranged symbol so as to define at least a substantial portion of each arranged symbol sufficient to identify the master symbol corresponding thereto, and providing selected of said master symbols with respective connective portions adjacent certain portions of the contour of the master symbols, and at least a portion of said connective portions comprises a thickness less than said certain thickness, removing selected metal portions from said plate from above to a certain depth smaller than said predetermined height between said arranged symbols so as to preserve connecting portions therebetween and between parts of said plate corresponding to a selected master symbol and any of its connective portions, thereby obtaining said group of arranged symbols in said one piece, at last some of the remaining parts of the predetermined height corresponding to said connective portions of said selected master symbols creating the appearance of bridging portions above said connecting portions and being separate from the corresponding adjacent arranged symbols, thereby partially masking said connecting portions.

2. The method as claimed in clam 1, wherein said transfer- and metal-removing mechanism comprises a feeler and cutter linked to one another in a predetermined manner, and further comprising the steps of feeling said contours and said connective portions with said feeler, and of removing said selected metal portions of said plate with said cutter.

3. The method as claimed in claim 2, wherein said feeler and said cutter are linked to one another so that any pattern traced by said feeler is substantially reproduced by said cutter according to a predetermined ratio.

4. The method as claimed in claim 2, wherein said predetermined ratio is a prearranged reduction ratio.

5. The method as claimed in claim 1, further comprising the step of providing selected of said master symbols with a loop, whereby another loop similar to said loop may be substantially defined in a corresponding of said group of symbols.

6. The method as claimed in claim 1, further comprising the step of assembling said master symbols along a prearranged direction so as to convey a predetermined meaning, whereby said group of arranged symbols conveys said predetermined meaning when read along a certain direction corresponding to said predetermined direction.

7. The method as claimed in claim 6, further comprising the step of arranging said group of symbols in the shape of a longitudinal strip, and wherein said certain direction is a horizontal direction.

8. The method as claimed in claim 6, further comprising the step of arranging said group of symbols in the shape of a longitudinal strip, and wherein said certain direction is a vertical direction.

9. The method as claimed in clam 1, wherein the shape of said connecting portions is selected so as to render said group of symbols relatively strong.

10. The method as claimed in claim 1, wherein each master symbol fits into a predetermined imaginary rectangle substantially defined by four boundary lines of the respective master symbol, and further comprising the step of extending each connective portion of said master symbol in a direction towards another master symbol placeable adjacent thereto, so that said connective portion has a length not projecting beyond the confines of said predetermined imaginary rectangle.

11. The method as claimed in claim 1, further comprising the step of arranging said connective portions adjacent to, but separate from each corresponding master symbol.

* * * * *